(12) United States Patent
Bahonar et al.

(10) Patent No.: US 10,584,568 B2
(45) Date of Patent: Mar. 10, 2020

(54) SYSTEM AND METHOD FOR ACCELERATED SOLVENT RECOVERY

(71) Applicant: CONOCOPHILLIPS COMPANY, Houston, TX (US)

(72) Inventors: Mehdi Bahonar, Calgary (CA); Danial Kaviani, Calgary (CA)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 15/925,039

(22) Filed: Mar. 19, 2018

(65) Prior Publication Data

US 2018/0266222 A1 Sep. 20, 2018

Related U.S. Application Data

(60) Provisional application No. 62/472,685, filed on Mar. 17, 2017.

(51) Int. Cl.
*E21B 43/24* (2006.01)
*C09K 8/592* (2006.01)

(52) U.S. Cl.
CPC .......... *E21B 43/2406* (2013.01); *C09K 8/592* (2013.01); *E21B 43/2408* (2013.01)

(58) Field of Classification Search
CPC .................................................. E21B 43/2408
See application file for complete search history.

(56) References Cited

U.S. PATENT DOCUMENTS

| 3,946,810 | A | * | 3/1976 | Barry | E21B 43/16 |
| | | | | | 166/272.3 |
| 4,513,819 | A | * | 4/1985 | Islip | E21B 43/24 |
| | | | | | 166/272.3 |
| 2003/0062159 | A1 | | 4/2003 | Nasr | |
| 2005/0211434 | A1 | * | 9/2005 | Gates | C09K 8/592 |
| | | | | | 166/272.3 |
| 2010/0276140 | A1 | * | 11/2010 | Edmunds | E21B 43/2408 |
| | | | | | 166/272.3 |
| 2014/0144627 | A1 | * | 5/2014 | Salazar Hernandez | |
| | | | | | C09K 8/592 |
| | | | | | 166/272.4 |
| 2015/0107834 | A1 | * | 4/2015 | Shen | E21B 43/2406 |
| | | | | | 166/272.3 |
| 2015/0198023 | A1 | * | 7/2015 | Thakur | E21B 43/24 |
| | | | | | 166/272.3 |

FOREIGN PATENT DOCUMENTS

| CA | 2875846 A1 * | 3/2015 | |
| CA | 2974714 A1 * | 9/2017 | E21B 43/16 |

* cited by examiner

*Primary Examiner* — Angela M DiTrani Leff
(74) *Attorney, Agent, or Firm* — Boulware & Valoir

(57) ABSTRACT

A system and method for steam assisted gravity drainage of hydrocarbons having increased solvent recovery to improve the economics of steam-only injection processes, such as steam assisted gravity drainage, while reducing environmental impact. Embodiments aid the condensation of solvent either by shutting-in or reducing the steam injection or by injecting a secondary lighter and cheaper solvent post solvent-steam co-injection, after which, normal steam injection at optimized operating conditions is restarted and continued until blow down while primary solvent recovery is continued, thus significantly accelerating and maximizing the recovery of solvent injected without affecting the long term cumulative bitumen production.

13 Claims, 2 Drawing Sheets

SYSTEM AND METHOD FOR ACCELERATED SOLVENT RECOVERY

CROSS-REFERENCE TO RELATED APPLICATIONS

This application is a non-provisional application which claims benefit under 35 USC § 119(e) to U.S. Provisional Application Ser. No. 62/472,685 filed Mar. 17, 2017, entitled "SYSTEM AND METHOD FOR ACCELERATED SOLVENT RECOVERY," which is incorporated herein in its entirety.

STATEMENT REGARDING FEDERALLY SPONSORED RESEARCH

None.

FIELD OF THE INVENTION

The present disclosure relates in general to the field of hydrocarbon drilling. More particularly, but not by way of limitation, embodiments of the present invention relate to a system and method for improved solvent-steam co-injection techniques having improved solvent recovery.

BACKGROUND OF THE INVENTION

Steam-assisted gravity drainage (SAGD) is the most common recovery method for the bitumen reservoirs with hundreds of wells producing every year. In SAGD, two long horizontal wells, typically distanced 5 m apart, are drilled into the formation. Steam at saturation condition is injected from the top well to deliver its energy to the cold bitumen and to significantly reduce the bitumen viscosity. The condensed steam mixed with melted bitumen, referred to as the emulsion, is then drained by gravity drainage mechanism and is produced from the bottom well. Solvent-steam co-injection processes intend to improve the performance of steam-only injection process (i.e., heat transfer mechanism) by aiding extra bitumen viscosity reduction due to diffusion and dispersion of the solvent into the bitumen. In such processes the solvent is co-injected with steam, preferentially at the early stage of the process, and then stopped after proper timing when the process is switched back to steam injection. Bitumen production acceleration and steam injection reduction have been demonstrated in several field trials for the solvent-steam co-injection period compared to pure steam injection scenario. The solvent could range from C3 to C30 range (pure or mixture) and can be designed and customized for the given reservoir characteristics and operating conditions. Other parameters such as solvent concentration, solvent injection profile, time of injection, duration of injection, operating conditions, and etc. also needs to be designed properly for a given reservoir conditions and solvent availability to achieve the full potential of this process and its economic merits.

Solvent-steam co-injection adds significant benefits to a normal steam injection process. However, while highly challenging to achieve, there is a critical need to ensure high and rapid solvent recovery because of the high price of solvent.

BRIEF SUMMARY OF THE DISCLOSURE

The present invention addresses limitations in the art by providing a system and method for stopping or minimizing steam injection post solvent-steam co-injection for a period of time and then restarting the steam injection process, aiming to increase the instantaneous and ultimate solvent recovery. In a normal solvent-steam co-injection process, steam is continued to be injected in the formation post solvent injection cease. Thermodynamically, this continuation of steam injection keeps significant amount of remaining solvent in the reservoir in the vapor phase and thus reduces the rate of solvent return which jeopardizes the economics of the entire process. Thus, a critical object of the present invention is to focus on the condensation of the valuable trapped solvent in reservoir and thus accelerating and maximizing the solvent recovery.

The present invention, through the illustrative embodiments set forth herein, addresses the post solvent-steam co-injection process to accelerate and maximize primary solvent recovery. Although, only embodiments in the SAGD environment are outlined in the present invention, it is a further object to address any solvent-steam co-injection processes. The present invention comprises a method of steam assisted gravity drainage of hydrocarbons having increased solvent recovery comprising: providing an injection well and production well in fluid communication with said injection well; injecting a first steam and primary solvent into said injection well for a first period of time; following said first period of time, injecting a secondary solvent into said injection well for a second period of time; and recovering said primary solvent and said secondary solvent from said production well.

In one aspect, the primary solvent comprises a Cn between C3 and C30. In another aspect, the secondary solvent comprises a Cn−1, the primary solvent comprising Cn, or has a lighter molecular weight than the primary solvent. In another aspect of the present invention, injecting said secondary solvent into said injection well for said second period of time occurs in the absence of steam injection. In yet another aspect, injecting the secondary solvent into the injection well for the second period of time includes steam co-injection. In some instances the secondary solvent injected into the injection well is vaporized solvent. Ultimately, the present invention allows for recovering and reusing said primary solvent and said secondary solvent and may be repeatable to optimize recovery of solvents used in connection with the hydrocarbon, or bitumen, recovery.

In another aspect of the present invention, a method of steam-assisted gravity drainage of hydrocarbons having increased solvent recovery comprising: providing an injection well and production well in fluid communication with the injection well; injecting a first steam and solvent into the injection well for a first period of time; following the first period of time, stopping the injection of the first steam and solvent for a second period of time; following the second period of time, injecting steam for a third period of time; and recovering the solvent from the production well.

Implementations of the invention can include one or more of the following features: The solvent may comprise a Cn between C3 and C30. The steam into the injection well for the third period of time occurs in the absence of solvent. The system and method allow for recovering and reusing the solvent. The steps occurring during the first period of time, followed by the second period of time, and followed by the third period of time, are repeatable.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF THE DISCLOSURE

Figure 1:
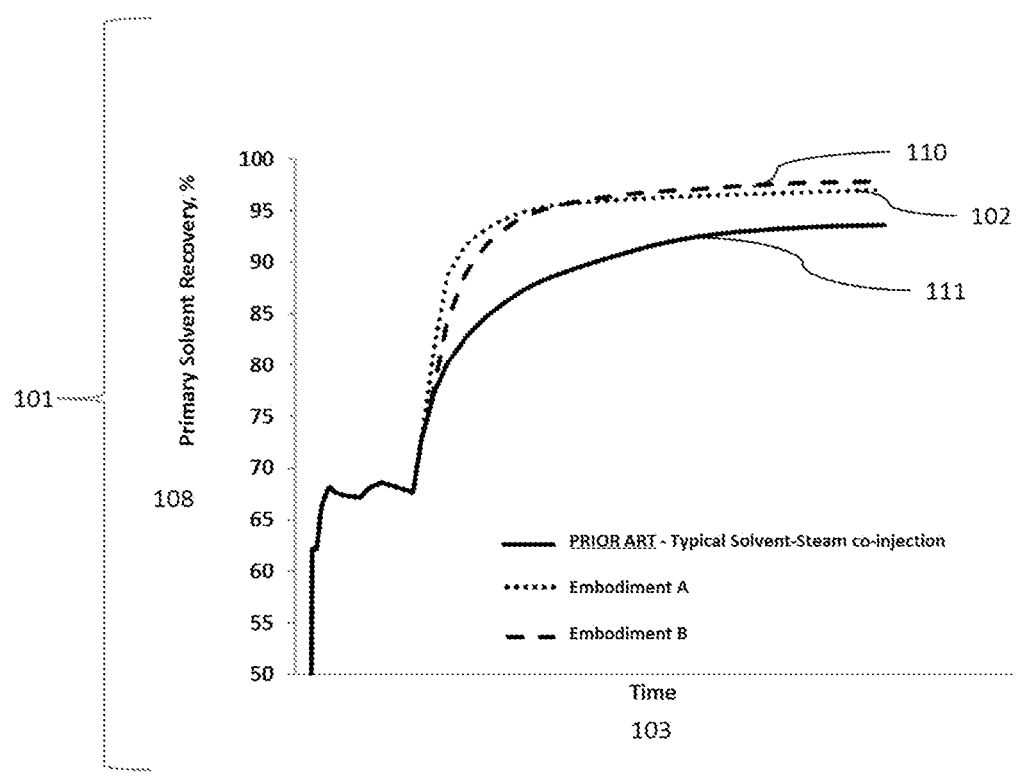
FIG. 1 depicts a Primary solvent recovery profile for different scenarios (y axis numbers are for illustrative purposes only) of the present invention.

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

While the making and using of various embodiments of the present disclosure are discussed in detail below, it should be appreciated that the present disclosure provides many applicable inventive concepts that can be embodied in a wide variety of specific contexts. The specific embodiments discussed herein are merely illustrative of specific ways to make and use the disclosure and do not limit the scope of the disclosure.

All publications and patent applications mentioned in the specification are indicative of the level of skill of those skilled in the art to which this disclosure pertains. All publications and patent applications are herein incorporated by reference to the same extent as if each individual publication or patent application was specifically and individually indicated to be incorporated by reference.

The present disclosure will now be described more fully hereinafter with reference to the accompanying figures and drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Steam-assisted gravity drainage (SAGD) applies to a horizontal injection well with an underlying production well. The fluid is injected through a top injection well to create a chamber in which the viscosity of bitumen is reduced. Then gravity drags it to the bottom well. SAGD consists of steam injection which heats the oil. The produced fluids the condensed injection fluid and the lower viscosity oil. In SAGD, large volumes of water and natural gas are required for steam generation.

For the purpose of the present invention, steam refers to water vapor or a combination of water in liquid form and water vapor, which may additionally contain trace elements, gases and other impurities, and may exist at varying temperatures.

For the purpose of the present invention, bitumen refers to crudes having less than 10° API, and are also known as extra heavy oils.

For the purpose of the present invention, solvent refers to a non-aqueous fluid capable of diluting bitumen. Examples of suitable candidates for solvents that may satisfy the selection criteria discussed more fully below include, without limitation, C1 to C30 hydrocarbons, preferably C1-C12, or C1-C8, and combinations thereof. Examples of suitable C1 to C30 solvents include, without limitation, alkanes such as methane, ethane, propane, butane, pentane, hexane, heptane, octane, nonane, decane, undecane, dodecane, etc., as well as various available hydrocarbon fractions, such as condensate, gasoline, light naphtha, diesel, and combinations thereof, as well as light gases, such as $CO_2$, $H_2S$, flue gases and the like.

In choosing suitable primary solvent, heavier solvents (heavy solvents) may be utilized, wherein the solvent vaporization temperature is close to the steam temperature and pressure under reservoir operating conditions. This means that the solvent should condense at approximately the same conditions that steam does. Generally speaking, C5-C12 or C5-C8 are preferred heavy solvents, and especially C5-C6 and/or C5-C7, although this can vary with reservoir conditions.

In choosing suitable lighter solvents, the solvent vaporization temperature should be below the steam temperature and pressure under reservoir operating conditions. This means that the solvent should condense after the steam does. Generally speaking, C1-C4 are preferred light solvents, and especially C3-C4, although this can also vary with reservoir conditions. However, for the purposes of the present invention, if primary solvent, which may comprise a heavy solvent, is C6 or a commercially available product such as diluent, C4 or C5 could be a good candidate for the secondary solvent. In general, if the primary solvent or its dominant composition is Cn, the secondary process could be Cn−1, Cn−2, . . . , C1 or any mixture of these.

Solvent-steam co-injection improves the performance of steam only injection processes (i.e., heat transfer mechanism) by aiding extra bitumen viscosity reduction due to diffusion and dispersion of the solvent into the bitumen. The solvent may range from C3 to C30 range (pure or mixture) and can be designed and customized for the given reservoir characteristics and operating conditions. Other parameters such as solvent concentration, solvent injection profile, time of injection, duration of injection, operating conditions, etc. are also developed for given reservoir conditions and solvent availability to achieve the full potential of the process and its economic merits.

A primary factor for low solvent recovery rate post-solvent injection is, once steam injection starts, the thermodynamic behavior of the system is such that significant fraction of retained solvent remains in the vapor phase. Some of the solvent that does condensate re-vaporizes near the injection well. Decreasing the operating pressure post-solvent injection to reduce the steam chamber temperature is not a definite solution. In this case, one factor, decreasing the temperature, is working in favor of solvent condensation and thus higher potential to produce, but lowering pressure will act in favor of vaporization. Typically, these two mechanisms (i.e., vaporization and condensation) counteract and solvent still tends to remain in the chamber.

Figure 2:
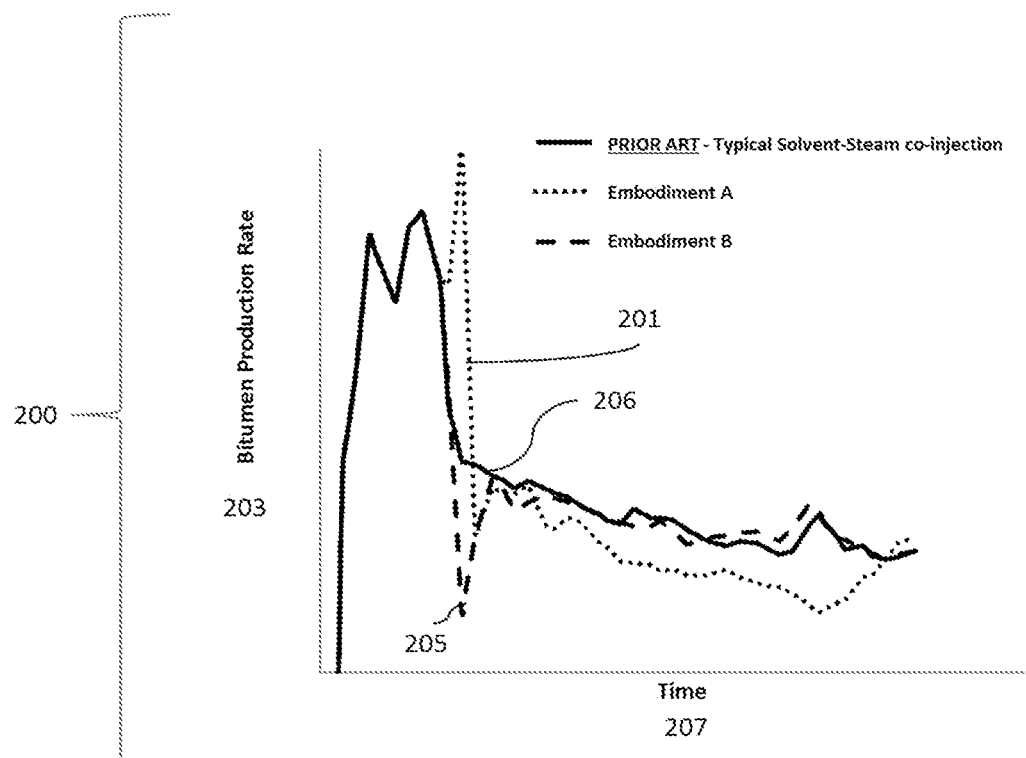
FIG. 2 depicts bitumen rate profile for different scenarios.
Figure 3:
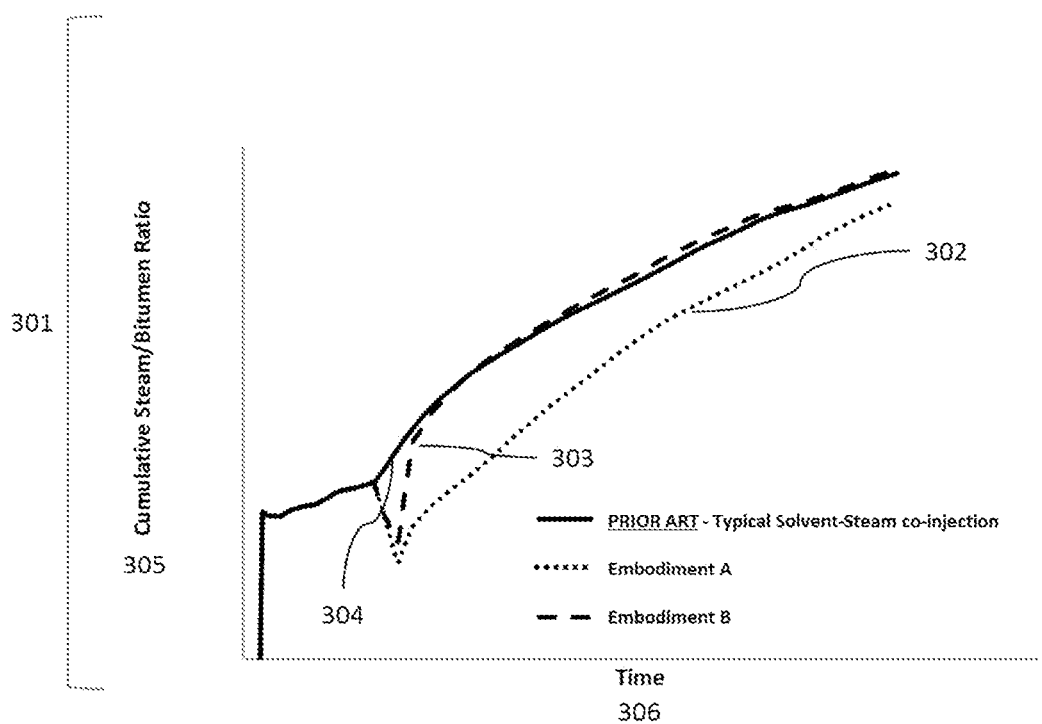
FIG. 3 depicts cumulative steam/bitumen ratio profile for different scenarios.

Turning to FIGS. 1-3, illustrative embodiments of a solvent recovery system of the present invention are provided, as well as characteristics of current techniques known in the art. FIG. 1 shows, in addition to aspects of the present invention, a typical solvent recovery profile 111 for normal solvent-steam co-injection process. As exemplified, the solvent recovery profile is relatively flat after initial solvent production ramp up and then it starts to slowly increase after solvent injection ceases. However, the rate of solvent production quickly decreases with time and ultimate solvent recovery is reached in a long time which is typically an undesirable factor for the NPV and process economics. This represents a key challenge for all proposed solvent-steam co-injection processes. The benefits of solvent injection with steam have been demonstrated in the field but low and/or slow solvent recovery profile is preventing many operators from the commercialization of this process due to high solvent price.

In one embodiment of the present invention, steam injection is stopped or significantly curtailed for a period of time post-primary solvent injection and at the same time injecting a lighter solvent at modified temperature. Utilizing this approach, the hydrocarbon production is continued and potentially increases when steam chamber temperature reduces which significantly helps solvent condensation. The combination of additional hydrocarbon acceleration and low or no steam injection during this time, significantly reduces the cumulative steam/bitumen ratio compared to a normal solvent-steam co-injection process. This reduction in cumulative steam/bitumen ratio will be realized for the rest of project life. Once certain solvent recovery is achieved, the steam injection is restarted and normal SAGD process may be followed.

Thus, after the primary solvent-steam co-injection period is completed, a secondary solvent at lower temperature is injected. The secondary solvent is typically lighter than the primary solvent (typically C3-C30) and therefore is much less expensive. For instance, if the primary solvent process utilizes C6 or a commercially available product such as diluent, C4 or C5 will adequately perform as a secondary solvent. In general, if the primary solvent or its dominant composition is Cn, the secondary process could be Cn−1, Cn−2, . . . , C1 or any mixture of these; however, the co-injection parameters such as type, concentration, temperature, pressure, and duration of injection should be optimized based on reservoir parameters and operating conditions. During the secondary solvent injection, minimal steam or no steam is required and production will be continued from the production well. The secondary solvent injection at low temperature (but still in vapor phase at reservoir conditions) will keep the pressure of the system high but dis-equilibrates the primary solvent phase behavior and promotes the solvent condensing to the liquid phase. After this period, normal steam injection is started and continues until the blow down period. As it can be seen from FIG. 1 101, which provides for primary solvent recovery 108 over time 103, unlike the typical prior art solvent-steam co-injection process 111, the solvent recovery profiles of the present invention embodiment A 102, and B 110 are much sharper and also results in higher ultimate solvent recovery. This significantly improves the economics of the recovery process. FIG. 2 200 shows the correlation of bitumen production rate 203 and time 207 for the prior art 206, embodiment A 201 and B 205 and depicts that during the secondary solvent injection of embodiment A of the present invention 201, this solvent mobilizes more oil in the chamber and bitumen rate increases. This means with little or no steam, a higher bitumen rate is achieved for a period of time which decreases the cumulative steam/bitumen ratio for the rest of the well life, as seen in FIG. 3 301, which shows the cumulative steam/bitumen ratio 305 as a function of time 306 for the prior art 304, embodiment A 302 and B 303. The decrease in cumulative steam bitumen ratio 302 is also due to accumulation of the lighter secondary solvent at the top of the reservoir which decreases the heat loss to the overburden and thus increases the energy management efficiency. The solvent recovery of the secondary solvent is also higher near the end of the process life and increases more during the blow down process with the similar mechanism as the secondary solvent process. Note that, as an exemplary embodiment, only the vaporized solvent is injected in this instance. However, if proper facilities for heating solvent do not exist, a small amount of steam helps vaporize the secondary solvent and will not reduce the efficiency of the process. The secondary solvent injection occurs for a period of time following the primary solvent-steam co-injection, and may be at a lower temperature. Further, the secondary solvent injection occurs in the absence of steam, although some steam may be utilized for optimized conditions. The recovery of the secondary solvent, which is much cheaper than primary solvent, is also high and can be accelerated and maximized by optimization and re-utilization or repeating of embodiments A and B, including a combination of the two.

In another embodiment of the present invention, the aforementioned system is employed, but no secondary solvent is used post-primary solvent cessation 110, 205, 303. Steam injection is stopped or significantly curtailed for a period of time post solvent injection; however, no solvent is co-injected at such time. The hydrocarbon production is continued when steam chamber pressure and temperature reduce which assists in solvent condensation. Once certain solvent recovery is achieved, the steam injection is restarted and normal SAGD process will be followed, hence little or no additional benefit in steam reduction and/or hydrocarbon acceleration will be realized due to secondary solvent injection. Rather the steam injection is stopped or significantly reduced while production is continued. FIG. 1 shows acceleration in primary solvent recovery and an increase in ultimate solvent production in this embodiment, shown as embodiment B 110. Again, the timing of the steps should be optimized based on reservoir properties and operating conditions. Additionally, the temperate-pressure equilibrium of the primary solvent will change and solvent tends to condensate and produce faster than normal solvent-steam co-injection process. Thus, the illustrative embodiment B 110 in FIG. 1 will not enjoy the long term additional benefit for cumulative steam/bitumen ratio and bitumen rate increase due to secondary solvent injection as in embodiment A 102 of FIG. 1.

Selection of the preferred embodiment of the present invention for the given reservoir depends on several factors including reservoir characteristics. After full optimization and economic evaluation the selected embodiment may be employed. None of the embodiments will affect the long term cumulative bitumen production if properly designed and applied.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

What is claimed is:

1. A method of steam assisted gravity drainage of hydrocarbons having increased solvent recovery, comprising:
   (a) providing an injection well and production well in fluid communication with said injection well;
   (b) injecting a first steam and primary solvent at a first temperature into said injection well for a first period of time without a secondary solvent;
   (c) following said first period of time, stopping injecting step b and at the same time injecting the secondary solvent without steam at a second temperature into said injection well for a second period of time, wherein said secondary solvent has a lighter molecular weight than said primary solvent and said temperature is lower than said first temperature and promotes condensation of said primary solvent; and
   (d) recovering said primary solvent and said secondary solvent and hydrocarbon from said production well, wherein more primary solvent is recovered than in a similar method without step c.

2. The method of claim 1, wherein the primary solvent comprises a Cn between C3 and C30.

3. The method of claim 1, wherein the secondary solvent comprises a Cn−1, the primary solvent comprising Cn.

4. The method of claim 1, wherein said secondary solvent injected into said injection well is vaporized solvent.

5. The method of claim 1, further comprising recovering and reusing said primary solvent and said secondary solvent.

6. The method of claim 1, wherein said first period of time and step b, followed by said second period of time and step c, are repeated.

7. The method of claim 1, wherein said hydrocarbon is bitumen.

8. A method for recovery of solvent during steam-assisted gravity drainage hydrocarbon recovery, comprising:
   (a) providing an injection well and production well in fluid communication with said injection well;
   (b) injecting a steam and primary solvent into said injection well for a first period of time without a secondary solvent;
   (c) following said first period of time, stopping injecting step b and at the same time injecting the secondary solvent without steam into said injection well for a second period of time, wherein said secondary solvent has a lighter molecular weight than said primary solvent and is injected at a temperature to promote condensation of said primary solvent; and
   (d) recovering said primary solvent and said secondary solvent and hydrocarbon from said production well, wherein a cumulative steam to hydrocarbon ratio is lower than in a similar method without step c.

9. The method of claim 8, wherein the primary solvent comprises a Cn between C3 and C30.

10. The method of claim 8, wherein the secondary solvent comprises a Cn−1, the primary solvent comprising Cn.

11. The method of claim 8, wherein said secondary solvent injected into said injection well is vaporized solvent.

12. The method of claim 8, further comprising recovering and reusing said primary solvent and said secondary solvent.

13. The method of claim 8, wherein said first period of time and step b, followed by said second period of time and step c, are repeated.

* * * * *